United States Patent [19]

Efimov et al.

[11] 4,338,178
[45] Jul. 6, 1982

[54] APPARATUS FOR ELECTROCHEMICAL PURIFICATION OF CONTAMINATED LIQUIDS

[76] Inventors: Vyacheslav T. Efimov, ulitsa Sumskaya, 59, kv. 2, Kharkov; Miron M. Nazarian, ulitsa Bljukhera, 13, kv. 138, Kharkov; Alexandr A. Axenko, ulitsa Baírona, 152, kv. 25, Kharkov; Vladimir A. Kolyada, ulitsa Petrozavodskaya, 91a, kv. 30, Kharkov; Anatoly X. Maskaev, ulitsa Studencheskaya, 12/14, kv. 25, Kiev; Ljudmila F. Shamsha, ulitsa Dinamovskaya, 3, kv. 23, Kharkov; Vladimir I. Kostjuk, ulitsa Uritskogo, 23, kv. 51, Kiev, all of U.S.S.R.

[21] Appl. No.: 223,993

[22] Filed: Jan. 12, 1981

[51] Int. Cl.³ .................. C25B 9/00; C25B 15/08; C02F 1/46
[52] U.S. Cl. .................... 204/275; 204/149; 204/277; 204/278
[58] Field of Search ............... 204/275–278, 204/149, 263–266

[56] References Cited

U.S. PATENT DOCUMENTS 3,853,736  12/1974  Harnden et al. ............. 204/275 X
3,989,608  11/1976  DeMonbrum et al. ......... 204/149
4,169,035   9/1979  Stummer et al. ............. 204/263 X
4,295,946  10/1981  Nazarian et al. ............ 204/149

FOREIGN PATENT DOCUMENTS 484064  12/1975  U.S.S.R. ................... 204/275
688445   9/1979  U.S.S.R. ................... 204/149

Primary Examiner—Delbert E. Gantz
Assistant Examiner—Donald R. Valentine
Attorney, Agent, or Firm—Robert E. Burns; Emmanuel J. Lobato; Bruce L. Adams

[57] ABSTRACT

An apparatus comprises a settling chamber having an outlet pipe to discharge purified liquid and communicating with an electrocoagulation chamber in whose bottom part a system of soluble electrodes is disposed. The electrocoagulation chamber has an inlet pipe to feed contaminated liquid, disposed above said system of soluble electrodes, and an inlet pipe to feed electrolyte, disposed below said system of soluble electrodes. A separating partition with an aperture and a check valve as well as an injector to deliver a fluid under the check valve are installed in the electrocoagulation chamber between the system of soluble electrodes and the inlet pipe to feed contaminated liquid, the check valve being adapted for a vertical movement under the action of the flow of the fluid delivered by the injector and of the flow of a gas-liquid mixture, ascending from the system of soluble electrodes.

4 Claims, 2 Drawing Figures

APPARATUS FOR ELECTROCHEMICAL PURIFICATION OF CONTAMINATED LIQUIDS

BACKGROUND OF THE INVENTION

1. Field of the Invention

The present invention relates to apparatus for purifying contaminated liquids and more particularly to apparatus for electrochemical purification of contaminated liquids.

The invention may be employed for purifying liquids contaminated with organic substances, mechanical suspensions, surfactants, and the like.

The invention is particularly useful for purifying liquids contaminated with polymers and petroleum products, such as waste waters containing oils and greases.

2. Description of the Prior Art

Of all the known devices for purifying contaminated liquids, the widest and ever increasing application has recently been found by apparatus for electrochemical purification of liquids, in particular those where liquid is purified by the electroflotation and electrocoagulation methods, which is due to their high performance capabilities.

Known in the art are apparatus where the process of electrochemical purification of contaminated liquid is accomplished either periodically, i.e. in batches, or continuously. The latter appear to be more promising. Such apparatus ordinarily comprise a settling chamber communicating with an electroflotation or an electrocoagulation chamber where electrodes are disposed. The apparatus comprising an electrocoagulation chamber with soluble electrodes, wherein also the flotation is accomplished, will be discussed hereinafter. The highest economic efficiency and purification rate are characteristic of those apparatus wherein the contaminated liquid is mixed with the electrode dissolution products in the electrocoagulation chamber above the electrodes, since this prevents fouling of the electrode surface by impurities contained in the contaminated liquid. Thus, an apparatus for electrochemical purification of waste waters (USSR Inventor's Certificate No. 644,738) comprises a settling chamber with outlet pipe to discharge purified liquid; said settling chamber communicates with an electrocoagulation chamber installed therewithin and having in its bottom part a system of soluble electrodes and an inlet pipe to feed electrolyte.

This apparatus suffers from a serious disadvantage consisting in that a portion of the sludge forming in the purification of a contaminated liquid settles to the bottom part of the electrocoagulation chamber, fouling the electrodes and clogging the interelectrode space and the inlet pipe to feed electrolyte. Moreover, the aggregates of hydroxides of the soluble electrode metal, contained in the sludge, may cause a short-circuit across the electrodes, which greatly impairs the operational dependability of the apparatus. Also, an intense fouling of the electrocoagulation chamber electrodes occurs at accidental interruptions in the electrolyte feed (such as in the event of a failure of the pump feeding the electrolyte). The above disadvantages, apart from impairing the operational dependability of the apparatus, lead also to a higher consumption of the electrodes and electric power in purifying contaminated liquids.

SUMMARY OF THE INVENTION

The principal object of the invention is to protect the soluble electrodes in the electrocoagulation chamber of an apparatus for electrochemical purification of contaminated liquid from fouling.

An object of the invention is also to reduce the consumption of the soluble electrodes and electric power in the course of purification.

Still another object of the invention is to upgrade the dependability of an apparatus for electrochemical purification of contaminated liquids.

The above-mentioned and other objects of the invention are attained by that in an apparatus for electrochemical purification of contaminated liquids, comprising a settling chamber with an outlet pipe to discharge purified liquid, which settling chamber communicating with an electrocoagulation chamber in whose bottom part a system of soluble electrodes is disposed and which is provided with an inlet pipe to feed purified liquid, disposed above said system of soluble electrodes, and with an inlet pipe to feed electrolyte, disposed below said system of soluble electrodes, according to the invention, a separating partition with an aperture wherein a check valve is mounted and an injector to deliver a fluid under the check valve are installed in the electrocoagulation chamber between the system of soluble electrodes and the inlet pipe to feed contaminated liquid, the check valve being adapted for a vertical movement under the action of a flow of the fluid delivered by said injector and of a flow of a gas-liquid mixture ascending from the system of soluble electrodes.

The provision in the electrocoagulation chamber of an apparatus for electrochemical purification of contaminated liquids of a partition with an aperture and check valve, interposed between the system of soluble electrodes and the inlet pipe to feed contaminated liquid, ensures a substantially complete elimination of electrode fouling by sludge and impurities in the course of purification and hence, reduces the consumption of the electrodes and electric power as well as upgrades the operational dependability of the apparatus.

The injector installed under the valve promotes a more rapid flow of electrolyte with electrode dissolution products through the aperture in the partition.

For a more reliable closing of the aperture in the partition by the check valve, the aperture and the check valve side surface are preferably given a conical configuration. Also, for a more intense mixing of the contaminated liquid with the electrode dissolution products, it is advisable that the check valve side surface have a helical groove which ensures rotation of the check valve when ascending currents flow through the aperture in the partition.

Giving the partition the configuration of a nozzle favours lowering the hydraulic resistance of the electrolyte flow as well as excludes swirlings in the flow in the zone of the partition. The nozzle is preferably of a converging profile.

To reduce the rate of build-up of sludge and impurities on the partition, it is useful to install insoluble electrodes over the partition. Gas bubbles originating on the surface of the electrodes will carry the sludge and impurity particles, and the rate of coagulation of impurities in the liquid being treated as it is passing through the electric field generated by the system of the electrodes will increase.

BRIEF DESCRIPTION OF THE DRAWINGS

The exact nature of the invention will now be explained by a detailed description of embodiments thereof with reference to the accompanying drawings, in which.

DETAILED DESCRIPTION OF THE INVENTION

Figure 2:
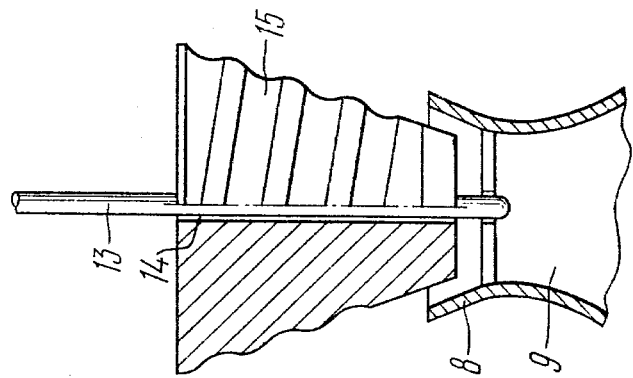
FIG. 2 is a more detailed view of a modification of the check valve.

An apparatus for electrochemical purification of contaminated liquids comprises (FIG. 1) a settling chamber 1 with outlet pipes 2, 3 to discharge purified liquid and sludge, respectively. The chamber 1 communicates with an electrocoagulation chamber 4 installed therewithin and having an inlet pipe 5 to feed contaminated liquid and an inlet pipe 6 to feed electrolyte. Soluble electrodes 7, such as of aluminium, are mounted in the chamber 4 between the inlet pipes 5 and 6. Also installed in the chamber 4, between the electrodes 7 and the inlet pipe 5, are a separating partition 8 with an aperture 9, having a check valve 10, and an injector 11 to deliver contaminated liquid under the check valve 10 (compressed air may be delivered instead of contaminated liquid), the contaminated liquid being delivered through the injector 11 by means of a pump 12. The check valve 10 is adapted for a vertical movement under the action of the flow of the contaminated liquid delivered by the injector 11 and of the flow of a gas-liquid mixture ascending from a system of the soluble electrodes 7, for which purpose a guide rod 13 is provided in the electrocoagulation chamber 4, and a hole 14, in the valve 10 (FIG. 2).

To enhance the operational dependability of the valve 10, the aperture 9 and the side surface of the valve 10 are of a conical configuration. To ensure rotation of the valve 10, its side surface is provided with a helical groove 15 best seen in FIG. 2.

Insoluble electrodes 16, on whose surface gas bubbles to carry up the settling sludge are formed, are installed over the partition 8.

Figure 1:
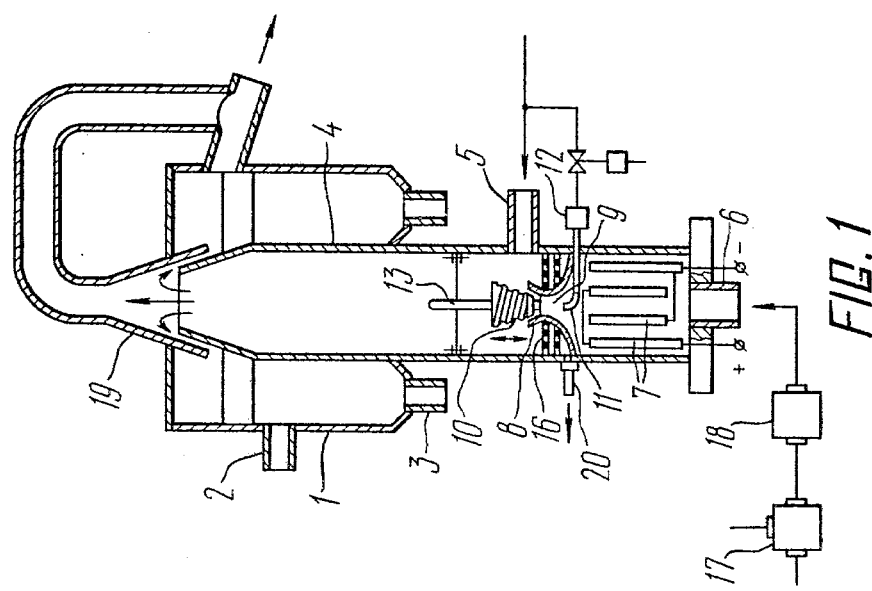
FIG. 1 is a diagrammatic sectional view of the preferred embodiment of the proposed apparatus for electrochemical purification of contaminated liquids.

Also shown in FIG. 1 are a mixer 17 to prepare electrolyte, a pump 18 to feed electrolyte into the electrocoagulation chamber 4, a device 19 to remove foam from the apparatus, and an outlet pipe 20 to remove sludge from the surface of the partition 8.

The proposed apparatus for electrochemical purification of contaminated liquids operates as follows.

Before starting the purification of a contaminated liquid, the inner space of the electrocoagulation chamber 4 (FIG. 1) and of the settling chamber 1 are through the inlet pipe 6 filled with pure electrolyte. Electric current is then applied to the electrodes 7, and in 25–30 s the feed of contaminated liquid through the inlet pipe 5 and the injector 11 into the electrocoagulation chamber 4 is started. In the course of the anodic dissolution of the electrodes 7, hydroxides of the metal of the electrodes and gas bubbles are formed. The hydroxides are carried up by the gas bubbles, pass through the aperture 9, and coagulate impurities contained in the contaminated liquid. The liquid thus treated, with aggregates of coagulated impurity particles and unused hydroxides contained therein, flows into the settling chamber 1 where foam separates off and sludge settles down. The purified liquid is discharged through the outlet pipe 2, the foam is removed by the device 19, and the sludge, through the outlet pipe 3. A portion of sludge settles down in the electrocoagulation chamber 4 onto the partition 8, wherefrom it is removed through the outlet pipe 20. When electric current is applied to the insoluble electrodes 16, the amount of sludge settling onto the partition 8 will be much less, since its major part will be carried up by gas bubbles originating on the surface of the insoluble electrodes 16.

It will be understood that the present invention is not intended to be limited to the embodiments thereof, described and shown hereinabove, and that various alterations and modifications of the proposed apparatus for electrochemical purification of contaminated liquids may be made without departing from the spirit and scope of the present invention.

What is claimed is:

1. An apparatus for electrochemical purification of contaminated liquids, comprising:
   a settling chamber having an outlet pipe to discharge purified liquid;
   an electrocoagulation chamber having a system of soluble electrodes, disposed in the bottom part of said electrocoagulation chamber;
   an inlet pipe to feed electrolyte, disposed below said system of soluble electrodes;
   an inlet pipe to feed contaminated liquid, disposed above said system of soluble electrodes;
   a separating partition with an aperture, interposed between said system of soluble electrodes and said inlet pipe to feed contaminated liquid and having a check valve installed in said aperture in said partition;
   an injector to deliver a fluid under said check valve, installed so as to enable said check valve to move vertically under the action of the flow of the fluid delivered by the injector and of the flow of a gas-liquid mixture, ascending from the system of soluble electrodes of said electrocoagulation chamber.

2. An apparatus as defined in claim 1, wherein the aperture in said partition, and said check valve, are of conical configuration and in which said check valve is moveable along a guide rod installed in said electrocoagulation chamber, the side surface of said check valve having a helical groove which ensures rotation of said check valve when ascending currents flow through the aperture in said partition.

3. An apparatus as defined in claim 1 or 2, wherein said separating partition has the configuration of a nozzle.

4. An apparatus as defined in claim 1 or 2, wherein insoluble electrodes are installed in said electrocoagulation chamber over said separating partition.

* * * * *